(12) United States Patent
Sullivan et al.

(10) Patent No.: US 12,103,870 B2
(45) Date of Patent: ***Oct. 1, 2024

(54) ROTATIONAL ELECTRO-OXIDATION REACTOR WITH IMPROVED BOUNDARY-LAYER DIFFUSION

(71) Applicant: e-OX Corporation Inc., San Francisco, CA (US)

(72) Inventors: Scott Sullivan, San Francisco, CA (US); Johannes A. Thomassen, Szczecinek woj. Zachodniopomorskie (PL)

(73) Assignee: e - OX Corporation Inc., San Francisco, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 18/118,183

(22) Filed: Mar. 7, 2023

(65) Prior Publication Data

US 2023/0202885 A1 Jun. 29, 2023

Related U.S. Application Data

(63) Continuation-in-part of application No. 16/612,209, filed as application No. PCT/US2018/027115 on Apr. 11, 2018, now Pat. No. 11,597,662.

(Continued)

(51) Int. Cl.
*C02F 1/467* (2023.01)
*C02F 1/461* (2023.01)

(52) U.S. Cl.
CPC ........ *C02F 1/46109* (2013.01); *C02F 1/4672* (2013.01); *C02F 2001/46123* (2013.01);

(Continued)

(58) Field of Classification Search
None
See application file for complete search history.

(56) References Cited

U.S. PATENT DOCUMENTS 4,125,439 A 11/1978 Fleischmann et al.
4,931,166 A 6/1990 Ramshaw
(Continued)

FOREIGN PATENT DOCUMENTS

CN 106430454 A 2/2017

OTHER PUBLICATIONS

International Search Report and Written Opinion for International Application No. PCT/US2018/027115 dated Jun. 22, 2018.

*Primary Examiner* — Wojciech Haske
(74) *Attorney, Agent, or Firm* — Young Basile Hanlon & MacFarlane, P.C.

(57) ABSTRACT

An electrochemical oxidation reactor includes rotatable electrodes inside a reactor vessel. The electrodes treat liquid within the reactor and are mounted to support plates, which in turn are mounted on each of two independently-driven shafts. The plates are attached to each other in a spaced relationship so that a gap is formed therebetween. The gap is sized to receive liquid to be treated so that liquid located within the gap will react with the electrodes. The shafts are rotatable at equal or different relative rotational speeds and directions. Additionally, each shaft may be independently linearly displaced in an oscillatory movement at equal or different frequencies. The relative shaft rotation, direction and axial vibration translate similar movements to the electrodes and such movement generates turbulence to the liquid located within the gap. The turbulence increases the interaction between liquid and the electrodes.

20 Claims, 14 Drawing Sheets

Related U.S. Application Data

(60) Provisional application No. 62/502,864, filed on May 8, 2017.

(52) U.S. Cl.
CPC .............. *C02F 2001/46152* (2013.01); *C02F 2201/003* (2013.01); *C02F 2201/4611* (2013.01); *C02F 2301/024* (2013.01); *C02F 2305/023* (2013.01)

(56) References Cited

U.S. PATENT DOCUMENTS

| | | |
|---|---|---|
| 5,759,384 A | 6/1998 | Silveri |
| 5,858,199 A | 1/1999 | Hanak |
| 2013/0206664 A1 | 8/2013 | Kim |
| 2014/0138238 A1 | 5/2014 | Wood et al. |
| 2015/0247248 A1 | 9/2015 | Thomassen |

ROTATIONAL ELECTRO-OXIDATION REACTOR WITH IMPROVED BOUNDARY-LAYER DIFFUSION

CROSS REFERENCE TO RELATED APPLICATION(S)

The present application is a Continuation-in-Part of U.S. patent application Ser. No. 16/612,209, filed on Nov. 8, 2019, which is a 371 National Stage Entry of PCT Application No. PCT/US2018/027115, filed on Apr. 11, 2018, which claims benefit of U.S. Provisional Application No. 62/502,864, filed on May 8, 2017, the entire disclosures of which are incorporated herein by reference in their entirety.

TECHNICAL FIELD

This disclosure relates generally to liquid purifiers, and more particularly, to such purifiers that utilize electrodes during the purification process.

BACKGROUND

An electrochemical reactor is a reactor used to purify liquids and includes a reactor vessel and electrodes. The reactor uses electric energy, which is applied to the electrodes, to generate an electrolytic process when a liquid is present. The materials used to make the electrodes may vary, depending on the type of liquid being purified. Regardless, the electric current must be isolated from the environment and only applied to the electrodes themselves. This means that most components used in the reactor, apart from the electrodes, are made from an insulating material, such as plastic or a material having an insulating layer thereon. The electrodes themselves can be made from a variety of materials including precious metals, such as silver, platinum, or gold. Other materials that have been used for the electrodes include copper, lead, magnesium, titanium, carbon/graphite, and boron doped diamond.

The electrodes may be housed in the reactor vessel, which is filled with a liquid to be treated. An electric current is then applied to the electrodes which starts the electrochemical reaction in the liquid.

There are many different applications for such electrochemical reactors. One application is the treatment of liquid including water, ethanol, many organic solvents, inorganic non-aqueous solvents, and acids.

Current commercial reactors in which this electrochemical technology is applied, are generally static, in that the electrodes remain stationary within the reactor vessel and the liquid to be treated flows across them.

In static electrochemical reactors, the limiting factor of the technology is the hydraulic condition in the reactor, and more specifically, a layer on top of the electrodes called the boundary layer. Whether the liquid in the reactor is in turbulent or laminar flow, the velocity in what is called the "laminar (viscous) sub layer," (the portion of the boundary layer which resides closest to the electrode interface) is extremely low. The liquid within this layer, which is immediately adjacent to the electrode is essentially stopped. Most of the liquid flowing within the static reactor may not effectively contact the surfaces of the electrodes. This, in turn, can limit the effectiveness and efficiency of the reactor itself. For a reactor to be efficient, the entire liquid being treated must move within the laminar sub layer.

The electrolytic reaction, which occurs in static electrochemical reactors as a result of the application of electric power to the electrodes, produces oxidants, such as $H_2O_2$ and $O_3$, and Hydroxyl Radicals. These oxidants and Hydroxyl Radicals are created at the surface of the electrodes and can be useful if they can react with the surrounding liquid to oxidize organic contaminants within the liquid. But, the Hydroxyl Radicals only exist for approximately $10^{-9}$ seconds (i.e., 1 nano-second). Owing to the extremely short life of the Hydroxyl Radicals, it is important to ensure that they react with as much of the surrounding liquid as possible to effectively and efficiently treat the subject liquid. However, since the velocity of the liquid at the electrode interface is essentially zero, as described above, very few, if any, of the generated radicals can be used for oxidation. The generated radicals may not interact with the organic matter located in any liquid that isn't already located within the laminar sub layer of the boundary layer. The organic matter located outside this laminar sub layer cannot reach the electrode surface, owing to the stagnant flow within the laminar sub layer region. This stagnant condition limits the use of the hydroxyl radicals for the production of oxidants in the laminar sub layer in the proximity of the electrode surface. The hydroxyl radicals formed in the laminar sub layer will essentially be unable to directly "oxidize" organic matter within the liquid except for an extremely low quantity of organic matter present within the laminar sub layer at the beginning of the reaction. For at least this reason, static electro-chemical reactors are not efficient in treating a subject contaminated liquid.

As liquid to be treated passes through the reactor vessel of a static electrochemical reactor, it will follow a path of least resistance (e.g., the liquid moves to the outlet of the vessel). In a static electrochemical reactor, there is no physical manner for the liquid to move into the laminar sub layer that is adjacent the electrode surfaces. One reason for this is that the liquid located at the laminar sub layer does not move and, since liquids are not compressible, the stagnant liquid at the surface of the electrodes effectively prevents any new liquid from entering into the laminar sub layer. The lack of flow within this layer adjacent the electrode surface reduces the chance that the liquid will be treated before reaching the outlet of the vessel.

In a static electrochemical reactor, an electrolyte, such as NaCl, may be required to increase the conductivity of the liquid within the reactor. The increase in conductivity increases the applied power to the reactor by allowing the flow of current (amperage) passing through the liquid to increase. The addition of this electrolyte (NaCl) and the increased power applied to the static reactor results in a production of Chlorine-based oxidants, such as NaOCl, Active Chlorine (Cl_), and HOCl, in addition to the O3 and H2O2 already created by the electrolytic process in the water phase of the treated liquid.

The production of all these Oxidants within the liquid changes the composition, as well as the osmotic pressure, of the laminar sub layer. The change in composition and the osmotic pressure in this layer creates a diffusion process between the laminar sub layer and the adjacent boundary layer above. This diffusion process will help mix the layers closest to the electrodes with the liquid within the bulk solution. The mass-transfer (effectiveness) of the oxidation in these static reactors is directly related to the efficiency of this boundary-layer diffusion process.

In an effort to increase the efficiency of static reactors, the velocity of the liquid passing through the reactor may be increased. Although this increase in liquid velocity will change the thickness of the boundary layer, it will not influence the composition, osmotic pressure, and the diffusion process in the laminar sub layer. As mentioned above, movement of liquid within the laminar sub layer is encouraged as a result of the electrolytic reaction therein.

The same diffusion from the static laminar sub layer towards the layers on top of the static laminar sub layer will still be a result of the diffusion process. An increase in velocity of the liquid will increase or decrease the diffusion process depending on the increased or decreased thickness of the boundary layer and the thickness of the static laminar sub layer. Therefore, in this situation, the increased velocity of the liquid can increase the mass-transfer of a static reactor. Such an increase in the velocity of the liquid decreases the residence time of the liquid in the reactor. The resulting mass transfer of the static reactor will likely remain low and inefficient likely requiring the recirculation of the liquid back through the reactor to obtain the desired oxidation efficiency.

In the end, static type electrochemical reactors remain inefficient at treating high volumes of contaminated liquid.

Embodiments according to this disclosure can overcome the deficiencies of static electrochemical reactors. Embodiments according to this disclosure provide an electrochemical reactor that increases mass-transfer over static electrochemical reactors.

SUMMARY

An electrochemical oxidation reactor includes rotatable electrodes inside a reactor vessel. The electrodes are mounted to support plates, which in turn are mounted on shafts. The plates are attached to each other in a spaced relationship so that a gap is formed therebetween. The plates are each electrically insulated from each other. The electrodes are mounted to the inside surfaces of these plates, inside the gap. The gap is sized to receive liquid to be treated so that liquid located within the gap reacts with the electrodes. An electrical charge is applied to each shaft so that a dielectric is formed across the gap within the liquid located in the gap.

The rotation of the support plates, and the electrodes discourage liquid located at the laminar sub layer from becoming stagnant and thereby increases reactor efficiency by increasing the interaction between the liquid located within the gap and the laminar sub layer located immediately adjacent to the surface of the electrodes. This arrangement allows for the full use of hydroxyl radicals generated by the electrodes and results in an overall increase of the electrolytic reaction and a drastic increase of the mass-transfer of the reactor.

Aspects of this disclosure provide the ability to adjust the rotational speed of the rotor assembly, allowing an infinite and dynamic variation of the speed of the electrode plates, resulting in an ability to adjust the thickness of the boundary layer, which is reduced in thickness by an increase of the axial velocity of the electrode plates. The availability of the hydroxyl radicals for oxidation of the organic components is the highest on the electrode surface. The high rotational velocity of the electrode plates results in a small enough thickness of the boundary layer on top of the electrodes to effectively use these hydroxyl radicals for the electrochemical oxidation purposes.

According to an embodiment of this disclosure, an electrochemical reactor includes two spaced electrode support plates. According to another embodiment of this disclosure, an electrochemical reactor includes several spaced electrode support plates.

According to another embodiments of this disclosure, each shaft is independently rotatable with respect to each other and the rotational speeds of the two shafts may be independently controlled. In this arrangement, both shafts may be rotated in common or different directions and rotational speeds. Additionally, each shaft may be linearly displaced along a longitudinal axis in a controlled vibrating or oscillatory manner, at the same frequency (generally), or at different frequencies.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
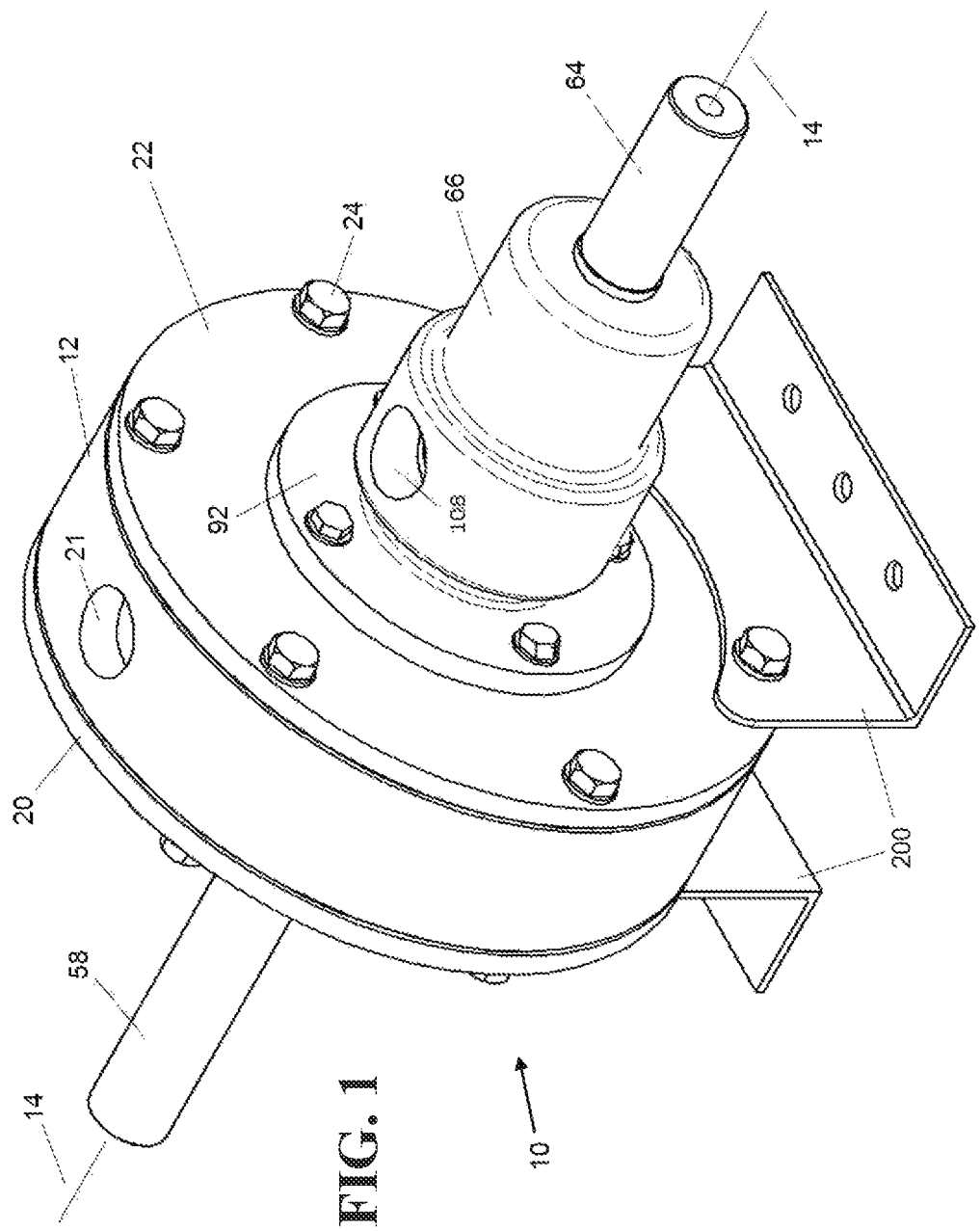
FIG. 1 is an upper right perspective view of the electrochemical oxidation reactor, according to embodiments of this disclosure, showing a reactor vessel, having an inlet and an outlet, and a shaft which supports a rotor assembly located within the vessel.

Referring now to FIGS. 1, 2, 3, and 4, a reactor 10 is shown. The reactor 10 includes a body 12. The body 12 can be hollow and cylindrical. The body 12 defines a longitudinal axis 14 and includes a left end 16, a right end 18, and a cylindrical central bore 19 located therebetween. The body 12 further includes a laterally disposed outlet port 21 that extends through the body 12 so that liquid communication between the bore 19 and a point outside the body 12 is established. The outlet port 21 is centered about an axis that is perpendicular to the longitudinal axis 14. A left end plate 20 and a right end plate 22 are sized and shaped to match the size and shape of the left end 16 and the right end 18 of the body 12, respectively, and may be secured to the body 12 using an appropriate means, such as threaded fasteners 24. Each of the left end plate 20 and the right end plate 22 includes a central opening 26, 28, respectively. The purpose of these openings is explained below. The body 12, and the left and right end plates 20, 22 are preferably made from a strong, corrosive-resistant metal. The corrosive-resistant metal can be aluminum, magnesium, titanium, or specific alloys thereof.

All metal components described hereinafter and used in the reactor 10 can be made from metals including Aluminum, Magnesium, Titanium, or Aluminum, Magnesium or Titanium Alloys. All the component surfaces can be treated (or coated) to have high resistance against oxidation and erosion and also to provide a surface with dielectric insulation properties. If the parts are made from aluminum, the Plasma-Electric-Oxidation (PEO) process can be used to provide a thin effective dielectric insulation layer on the aluminum components. PEO changes the aluminum surface to an $Al_2O_3$ ceramic, which is a dielectric insulating surface. Processes and techniques, other than PEO, can be used.

Figure 2:
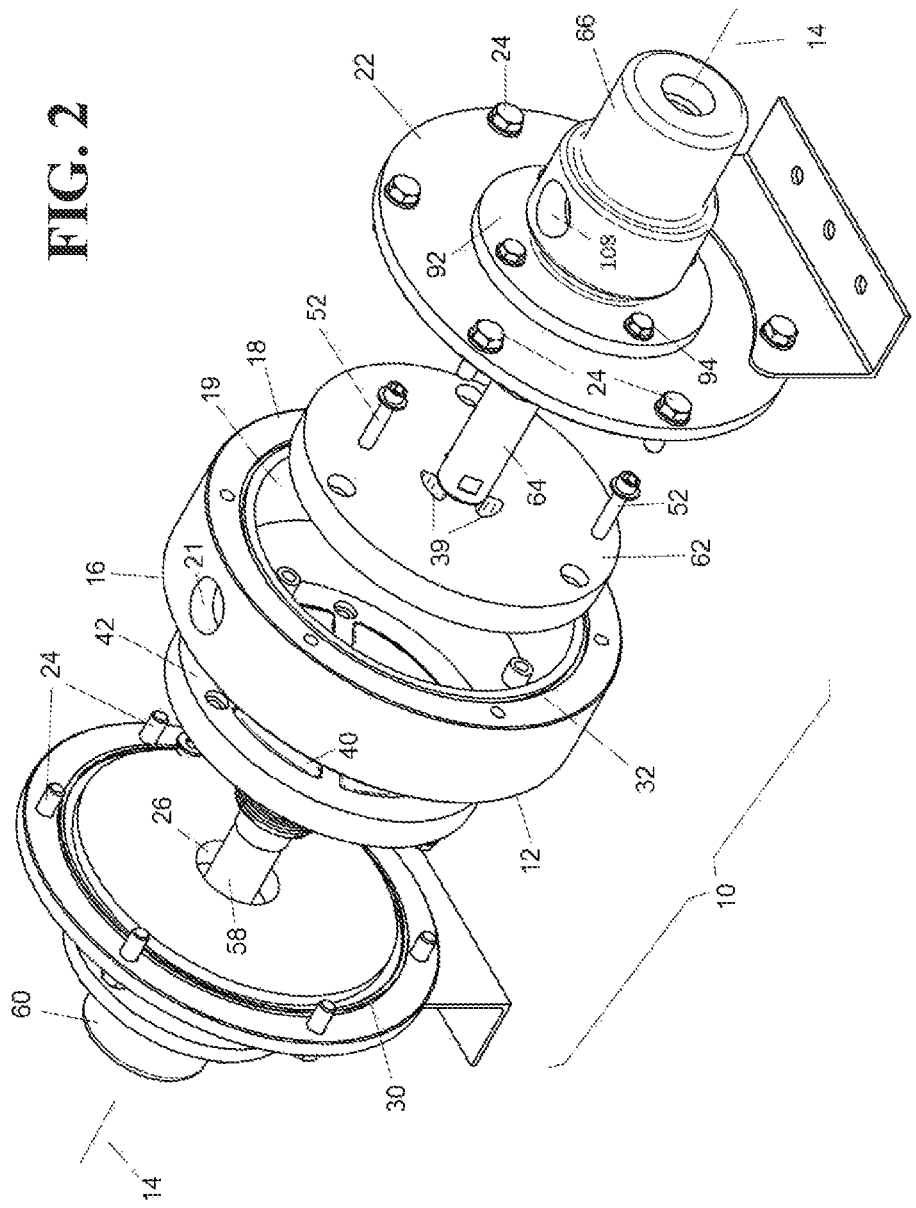
FIG. 2 is an upper right perspective assembly view of the electrochemical oxidation reactor of FIG. 1, according to embodiments of this disclosure, showing details of the reactor vessel and the rotor assembly.
Figure 3:
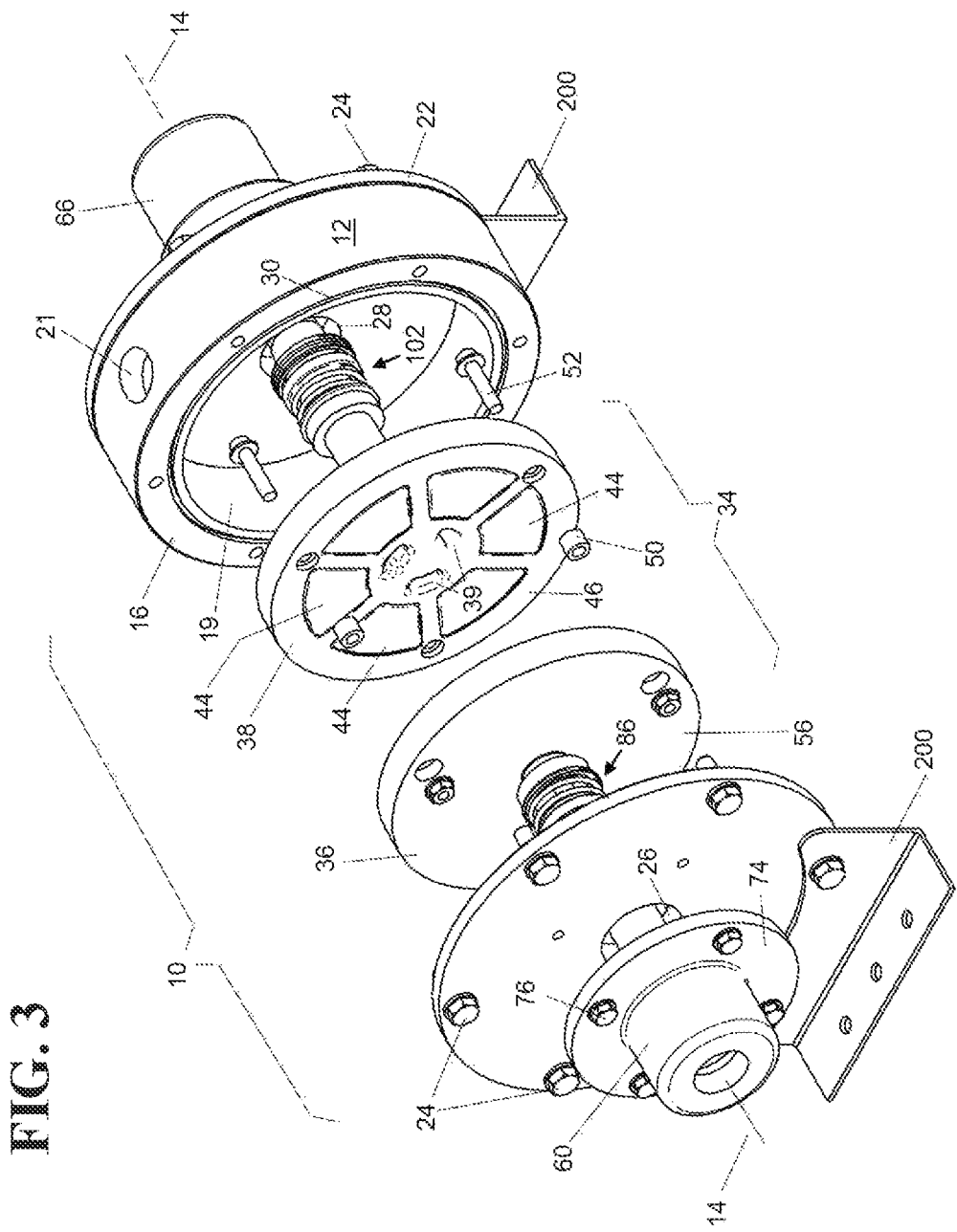
FIG. 3 is an upper left perspective assembly view of the electrochemical oxidation reactor of FIG. 1, according to embodiments of this disclosure, showing details of the reactor vessel and the rotor assembly.

The left and right end plates 20, 22 are secured to the body 12 so that the interface between each end plate and its respective left and right end of the body 12 forms a water-tight seal (up to a predetermined working pressure, including an acceptable safety factor). A variety of known appropriate seals can be used at these two interfaces, including gaskets and applied sealant adhesives. An O-ring 30, which can be made of rubber, positioned within a circumferential channel is preferred, as shown in FIGS. 2 and 3.

The left end plate 20 is secured to the left end 16 of the body 12 using O-ring 30 and threaded fasteners 24 so that a water-tight seal is formed at the interface of the two parts. Similarly, the right end plate 22 is secured to the right end 18 of the body 12 using O-ring 32 and threaded fasteners 24 so that a water-tight seal is formed at the interface of the two parts. O-rings can be effective at creating a tight (e.g., water tight or air tight) seal between two mating surfaces, even in assemblies where one of the surfaces moves relative to the other. O-rings are used in the present electrochemical reactor assembly at various locations where a water-tight seal is required. O-ring seal structures, including mating O-ring channels, are well known and, as such, are not described herein in detail. Such sealing details are well within the understanding of those having ordinary skill in the art.

Figure 4:
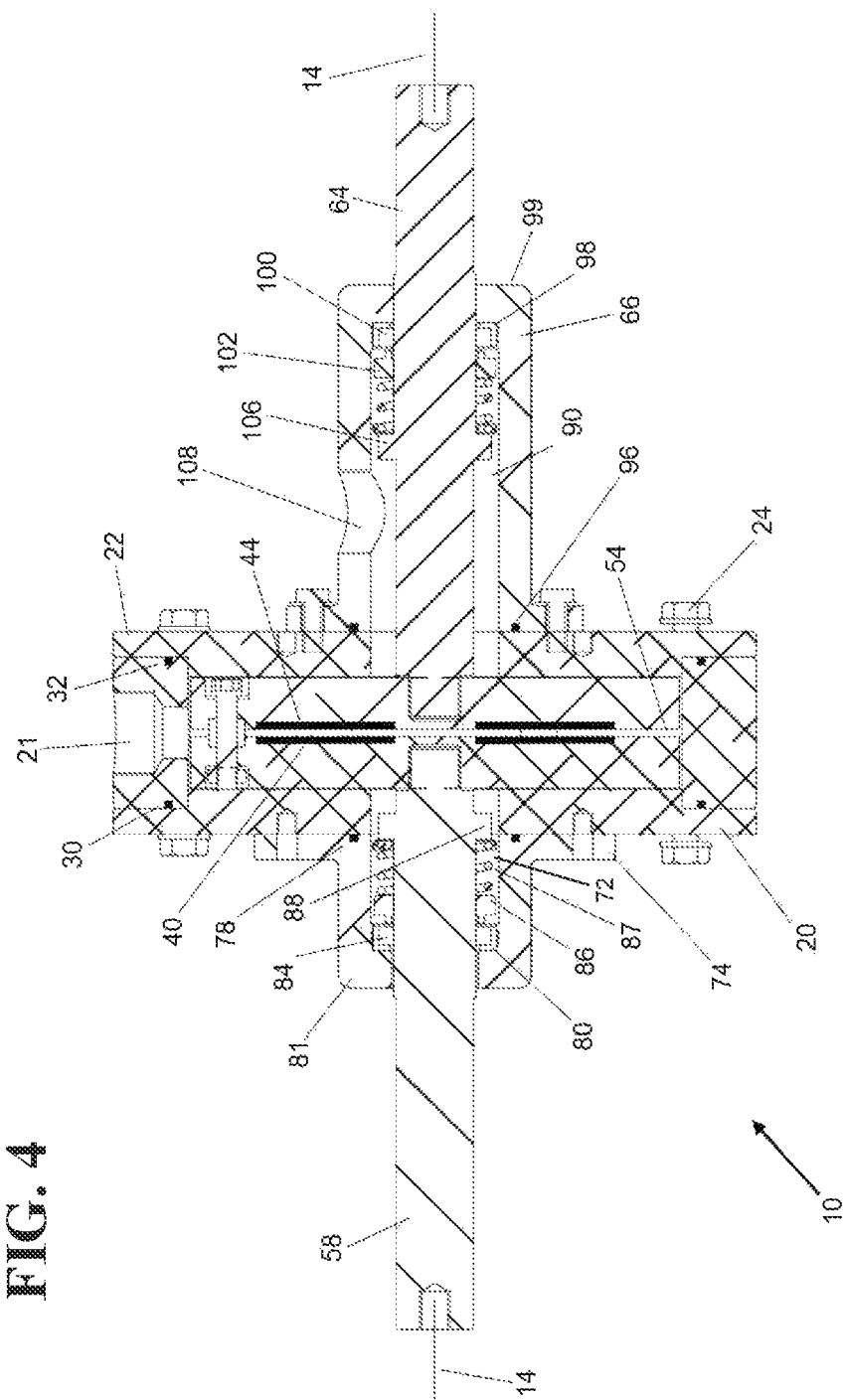
FIG. 4 is a cross-sectional side view of the electrochemical oxidation reactor, taken along the line 4-4 of FIG. 1, according to a first embodiment of this disclosure, showing details of a rotor assembly supporting an electrode plate and being rotatably mounted within a vessel body.

The bore 19 of the body 12 is sized and shaped to receive a rotor assembly 34 so that the rotor assembly 34 may freely rotate within the bore 19 and about the longitudinal axis 14, as described below. In an embodiment, the distance between the rotor assembly 34 and the walls of the bore 19 are between 1 mm and 2 mm. According to a first embodiment, the rotor assembly 34 includes a left electrode support plate 36 and a right electrode support plate 38. As shown in FIGS. 2, 3, and 4, the left electrode support plate 36 supports at least one electrode 40 on a right-side surface 42. Similarly, the right electrode support plate 38 supports at least one electrode 44 on a left-side surface 46. The electrode support plates 36, 38 are provided with precision cut recesses (not shown) that are sized and shaped to snugly receive the electrodes 40, 44 so that the exposed surface of each electrode resides flush to the surface of the respective electrode support plate. The right electrode support plate 38 can include openings 39 close to the longitudinal axis 14. FIG. 2 shows three openings. However, any number of openings can be used (e.g., six openings). A different number of the openings 39 and/or openings of a different size can be used depending on the engineering requirements of an input liquid flow. For example, more openings 39 or openings of a larger size can accommodate more flow. The openings 39 allow liquid entering the reactor 10 to pass the right electrode support plate 38 during operation, as described in greater detail below. The openings 39 are only located on the right electrode support plate 38.

The electrodes 40, 44 may be made from known conventional electrode materials, such as platinum, gold, silver, magnesium, titanium, copper, lead or carbon, boron doped diamond, graphene, and other allotropes of carbon. The electrodes 40, 44 are preferably secured to the electrode support plates 36, 38 by being pressed to a tolerance-fit within the recesses formed within each of the electrode support plates 36, 38, as described above. The electrodes must be able to withstand rotation within a relatively harsh environment and cannot come loose (e.g., dislodge) during operation. Press-fit securement into the electrode support plates 36, 38 can ensure a reliable and secure attachment. Other appropriate mechanical fasteners may be used to secure the electrodes to the electrode support plates, including threaded fasteners, clamp plates, and/o an appropriate adhesive bond. The appropriate fastening method can vary depending on the type of electrode used.

The electrodes 40, 44 are preferably shaped to fit each electrode support plate 36, 38 so as to cover a maximum surface area and are secured and balanced about the longitudinal axis 14 in such a manner as to allow smooth and balanced rotation of the rotor assembly 34 during operation, as explained in greater detail below. During operation of the reactor 10, as described in greater detail below, the rotor assembly 34 can rotate between 2500 and 7500 revolutions per minutes (RPMs), depending on the size of the rotor assembly 34. Therefore, the rotor assembly 34 is expected to be balanced and can handle such rotation smoothly.

In some embodiments, the electrodes may not cover the entire electrode support plates. As such, the electrodes can be located closer to the periphery of the circular electrode support plates. Such placement can help increase the efficiency of the electrodes 40, 44 since the axial velocity of the electrode support plates 36, 38 increases with an increasing radius (i.e., the distance from the longitudinal axis). The further away from the axis of rotation (i.e., the longitudinal axis 14) of the rotor assembly 34 the electrodes 40, 44 are positioned, the faster the electrode surface can pass through the passing liquid to be treated and the more effective and efficient the reaction with the liquid can be. The plates rotate with the same RPMs. However the surface velocity relative to liquid adjacent the electrodes 40, 44 varies depending on the radial position of the liquid relative to the electrode support plates 36, 38.

As shown in FIG. 4, and according to this first embodiment, the electrode support plates 36, 38 are secured to each other at a predetermined and exact distance apart using spacers 50 and threaded fasteners 52, so that a gap 54 is defined between the facing surfaces of the respectively mounted electrodes (i.e., the electrodes 40, 44). As explained below, liquid to be treated can flow through this gap. The size of the gap 54 can vary depending on the specific application of the reactor. In some examples, the gap 54 can be between 2 mm and 5 mm across.

As shown in FIGS. 2 and 3, a left-side surface 56 of the left electrode support plate 36, can be secured to a left shaft 58. The left shaft 58 can extend through the central opening 26 of the left end plate 20 and can pass through a left shaft adaptor 60. Accordingly, a portion of the left shaft 58 can be accessible outside of the body 12 and outside of the left end plate 20.

Similarly, a right-side surface 62 of the right electrode support plate 38, can be secured to a right shaft 64. The right shaft 64 can extend through the central opening 28 of the right end plate 22 and can pass through a right shaft adaptor 66. Accordingly, a portion of the right shaft 64 can be accessible outside of the body 12 and outside of the right end plate 22.

Figure 6:
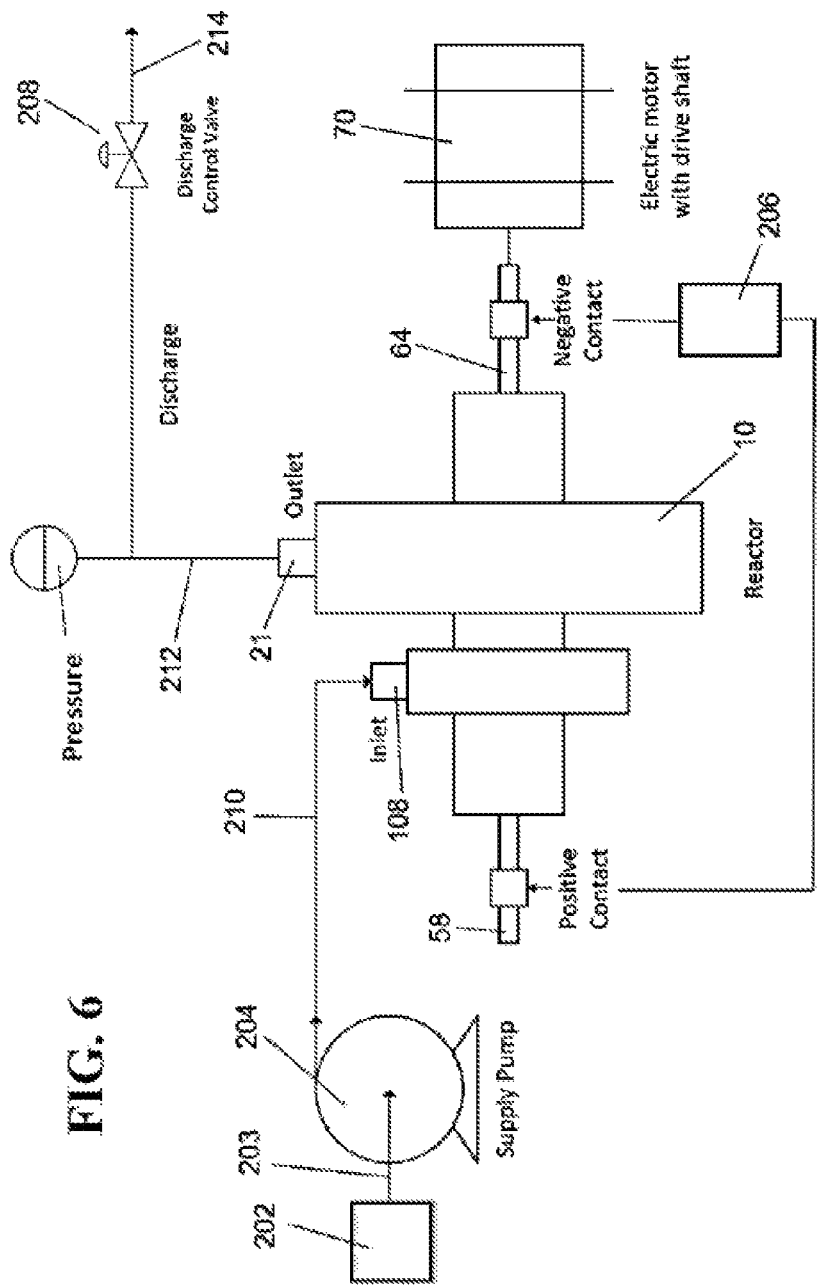
FIG. 6 is a flow schematic of the electrochemical oxidation reactor system, according to embodiments of this disclosure, showing the flow of a liquid to be treated into and out of the reactor vessel, and including a power supply, an electric drive motor, and a control valve.

According to embodiments of this disclosure, and as described in greater detail below, the accessible portions of the left and the right shafts 58, 64 can be used to apply electrical power to the electrodes 40, 44, via electrically conductive shafts (i.e., the left shaft 58 and the right shaft 64) and the electrically conductive electrode support plates 36, 38. Also, either or both of the shafts 58, 64 can be mechanically rotated using a motor 70, as shown in FIG. 6 and as described below.

Figure 5:
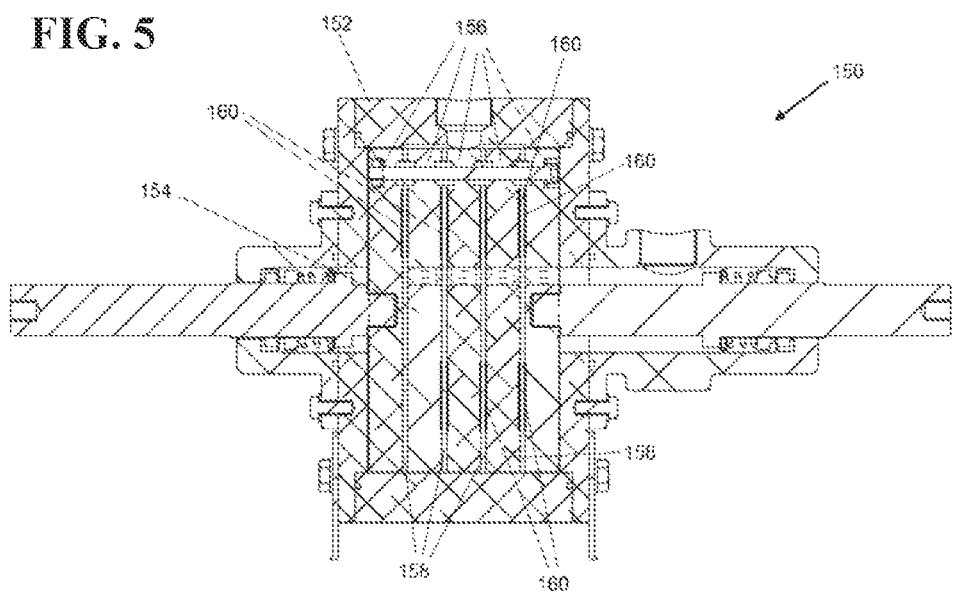
FIG. 5 is a cross-sectional side view of an electrochemical oxidation reactor, similar in view to that of FIG. 4, according to a second embodiment of this disclosure, showing details of an electrode rotor assembly supporting multiple electrode plates and being rotatably mounted within a vessel body.

The rotor assembly 34, including the electrodes 40, 44 and the electrode support plates 36, 38 may rotate within the bore 19 of the body 12, about the longitudinal axis 14. The rotor assembly 34 can be supported by the shafts 58, 64, which in turn, can be rotatably supported by the left and right shaft adaptors 60, 66. The left shaft adaptor 60 can include a first bore 72, centered about the longitudinal axis 14, and can be sized and shaped to receive the left shaft 58. The left shaft adaptor 60 can include an outer flange 74 with openings for receiving threaded fasteners 76. The openings of the outer flange 74 can be evenly spaced. The threaded fasteners 76 can be used to secure the left shaft adaptor 60 to the left end plate 20 about the central opening 26 and in a water-tight manner. As shown in FIG. 5, an O-ring seal 78 can be used to form a water tight seal. As mentioned above, other types of seals may be used. For example, a gasket, an O-ring seal, or a mating-ring type mechanical seal (such as a type commercially available by US Seal, Mfg. of Somerset, N.J.), or the like, can be used. As shown in FIGS. 2, 3, and 4, the left shaft adaptor 60 can further include a second bore 80 concentric to the first bore 72. The second bore 80 can be slightly smaller in diameter than the first bore 72. The second bore 80 can be located adjacent an end wall 81 of the left shaft adaptor 60 and can be sized to snugly receive a bearing 84. As shown in FIGS. 2, 3, and 4, a mechanical shaft-seal assembly 86 can be positioned within the first bore 72, immediately adjacent to the bearing 84, and can be designed to press tightly against the bearing 84 by a spring 87. The left shaft 58 can include an integrally machined flange 88 that can be positioned to support the spring 87, as is well known by those skilled in the art. The bearing 84 can be sized to snugly receive the shaft 58 and provide rotational support to the shaft 58 during operation of the reactor 10.

The mechanical shaft-seal assembly 86 is a well-known type of shaft seal that provides a reliable liquid-tight seal about the shaft 58 so that pressurized liquid, passing through the bore 19 of the body 12 to be treated, does not escape between the left shaft 58 and the left shaft adaptor 60 when the shaft 58 rotates or is stationary.

Similarly, the right shaft adaptor 66 can include a first bore 90, centered about the longitudinal axis 14, that is sized and shaped to receive the right shaft 64 and includes an external flange 92 with openings for receiving the threaded fasteners 94. The openings can be evenly spaced. The threaded fasteners 94 can be used to secure the right shaft adaptor 66 to the right end plate 22, about the central opening 28, in a water-tight manner. As shown in FIG. 4, an O-ring seal 96 can be used to form a water tight seal. As mentioned above, other seals may be used, including a gasket, an O-ring seal, or a mating-ring type mechanical seal. As shown in FIGS. 2, 3, and 4, the right shaft adaptor 66 can further include a second bore 98 concentric to the first bore 90 and is slightly smaller in diameter. The second bore 98 can be located adjacent an end wall 99 of the right shaft adaptor 66 and can be sized to snugly receive a bearing 100. As shown in FIG. 4, a mechanical shaft-seal assembly 102 can be positioned within the first bore 90, immediately adjacent to the bearing 100, and can be designed to press against the bearing 100 by the spring 104. The right shaft 64 can includes an integrally machined flange 106 positioned to support the spring 104, as is well known by those skilled in the art. The bearing 100 can be sized to snugly receive the right shaft 64 and provide rotational support to the shaft 64 during operation of the reactor 10.

The mechanical shaft-seal assembly 102 can be a well-known type of shaft seal that provides a reliable liquid-tight seal about the shaft 64 so that pressurized liquid, being treated within the bore 19 of the body 12, does not escape between the right shaft 64 and the right shaft adaptor 66 when the shaft 64 rotates or is stationary. The right shaft adaptor 66 can be almost the same as described above with respect to the left shaft adaptor 60, except that right shaft adaptor 66 can be longer (as measured along the longitudinal axis 14) and can include an inlet port 108. The inlet port 108 can be laterally disposed on right shaft adaptor 66. As shown in FIG. 4, the inlet port 108 can extend through the wall of the right shaft adaptor 66 and can provide liquid communication between the first bore 90 and a point outside the reactor 10, as described below.

All metal component surfaces of the mechanical seal can have the same surface treatment/coating, described above so as to have a high resistance against oxidation and erosion.

Referring to FIG. 5, a reactor 150 is shown, according to a second embodiment of this disclosure. The reactor 150 includes a body 152 that is longer than the body 12 of reactor 10 of FIG. 4 and according to the first embodiment of this disclosure, described above. The body 152 is sized to accommodate a rotor assembly 154 that includes multiple electrode plates 156. Each electrode plate 156 is secured to at least one other electrode plate 156 in the same manner as the left electrode support plate 36 is secured to the right electrode support plate 38 as described with respect to FIG. 4. The multiple electrode plates 156 are secured to each other to form a stack. In the example of FIG. 5, five electrode plates 156 are secured to each other, forming four gaps 158 through which liquid can pass against the electrodes 160 mounted in adjacent surfaces of each electrode plate 156, as in the above described first embodiment. In other examples, more or less than five electrode plates 156 can be used.

Apart from the accommodation of multiple electrode plates 156, the structure, assembly, and operation of reactor 150 can be the same as the reactor 10 described above and shown in FIGS. 2, 3, and 4. As such, the structure, assembly, and operation of the reactor 150 of FIG. 5 is not specifically described here in any great detail. Providing a reactor with additional electrode plates 156 (and, therefore, additional gaps 158) and additional electrodes 160 increases the electrode surface to maximize the electrochemical oxidation reaction and thereby allows the treatment of a greater volume of contaminated liquid over a given time period.

Figure 9:
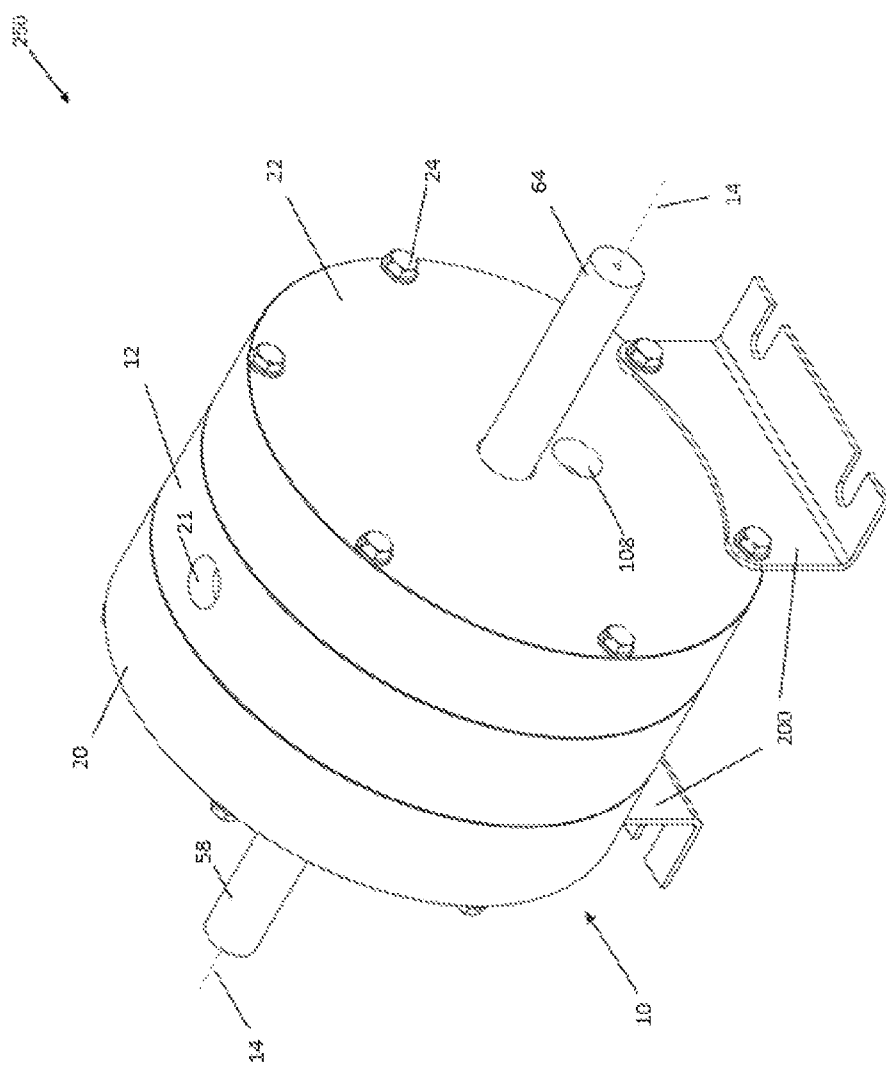
FIG. 9 is a perspective view of a reactor according to a third embodiment of this disclosure.
Figure 10:
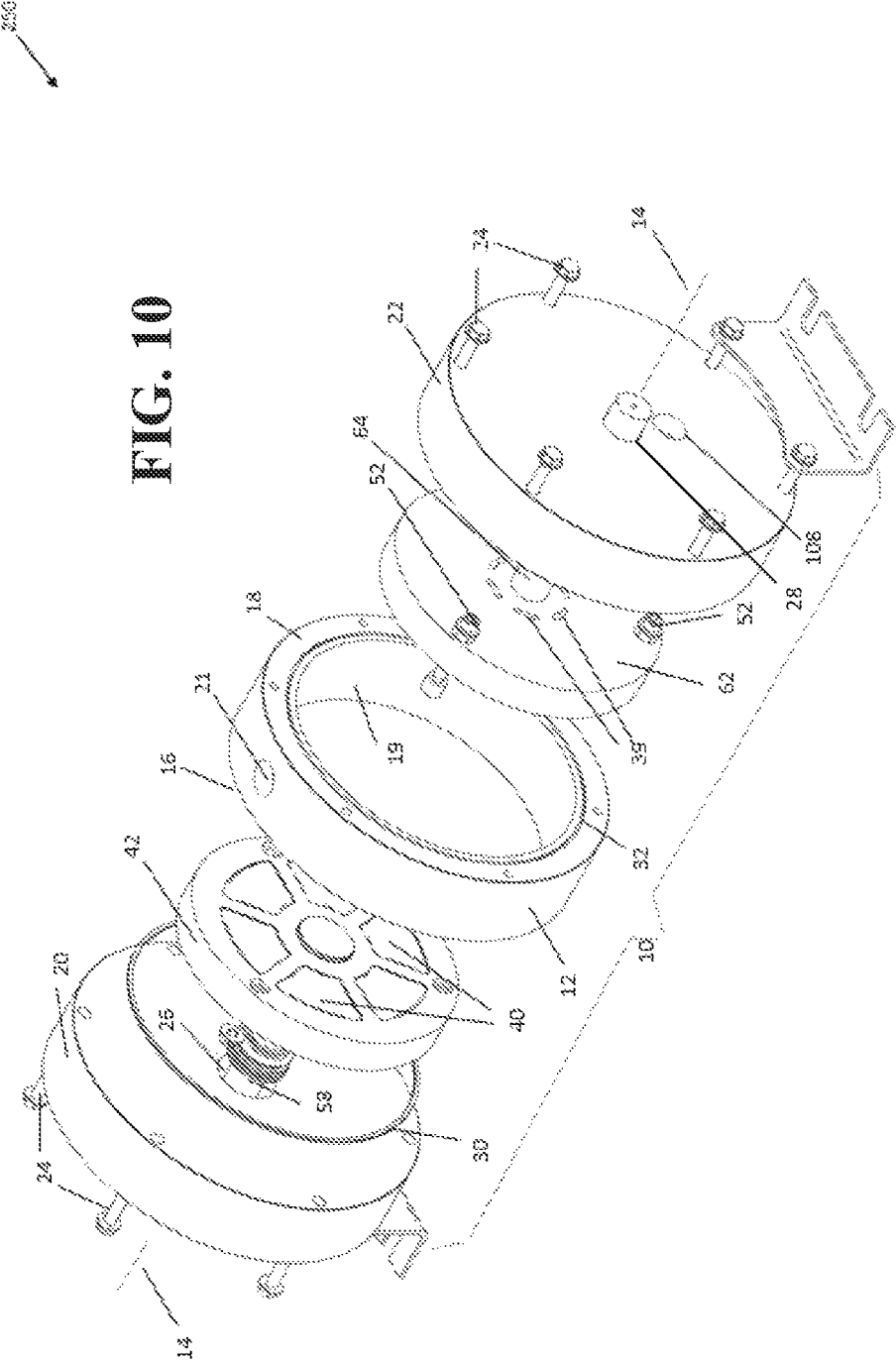
FIG. 10 is a right perspective assembly view of the reactor of FIG. 9.
Figure 11:
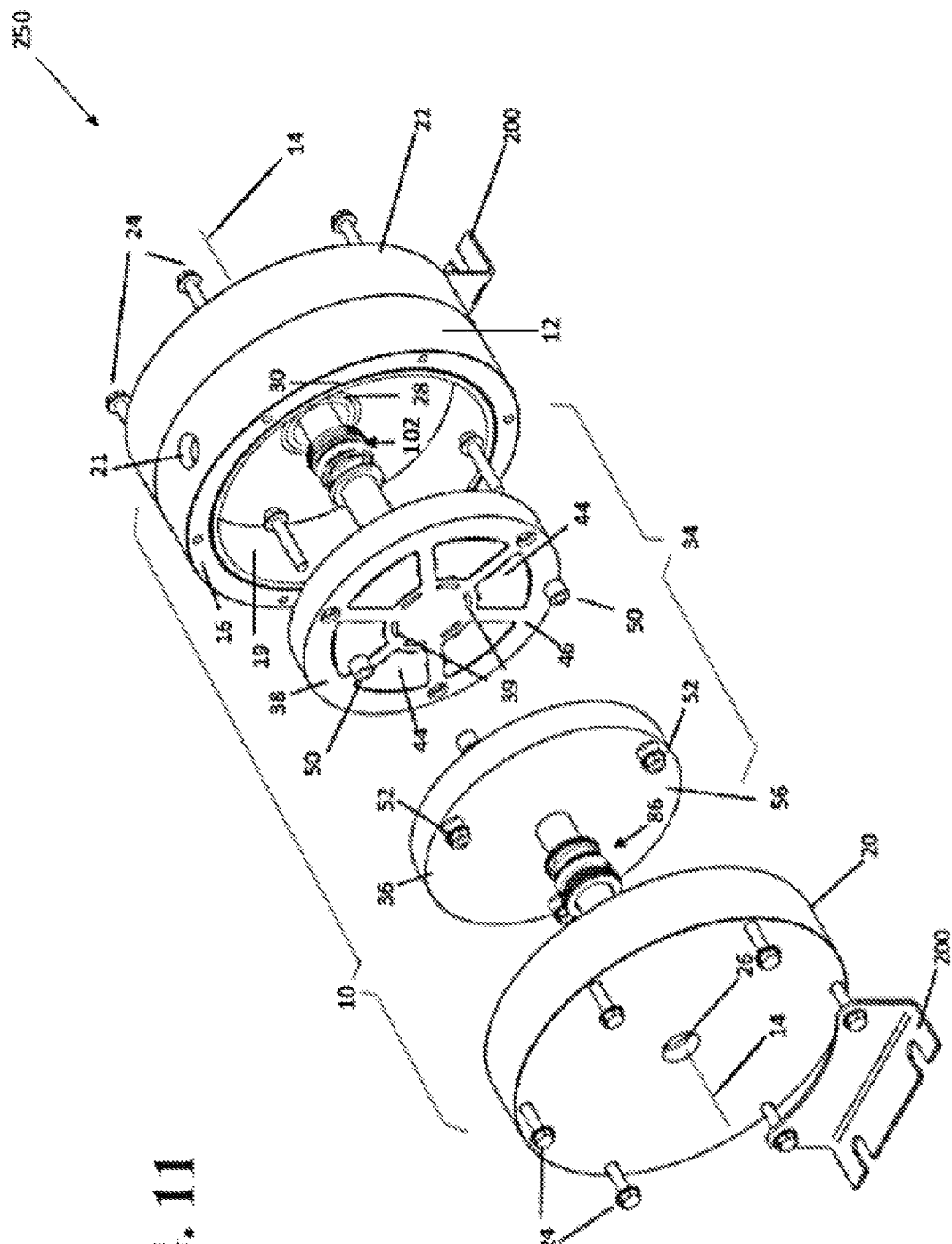
FIG. 11 is a left perspective assembly view of the reactor of FIG. 9.
Figure 12:
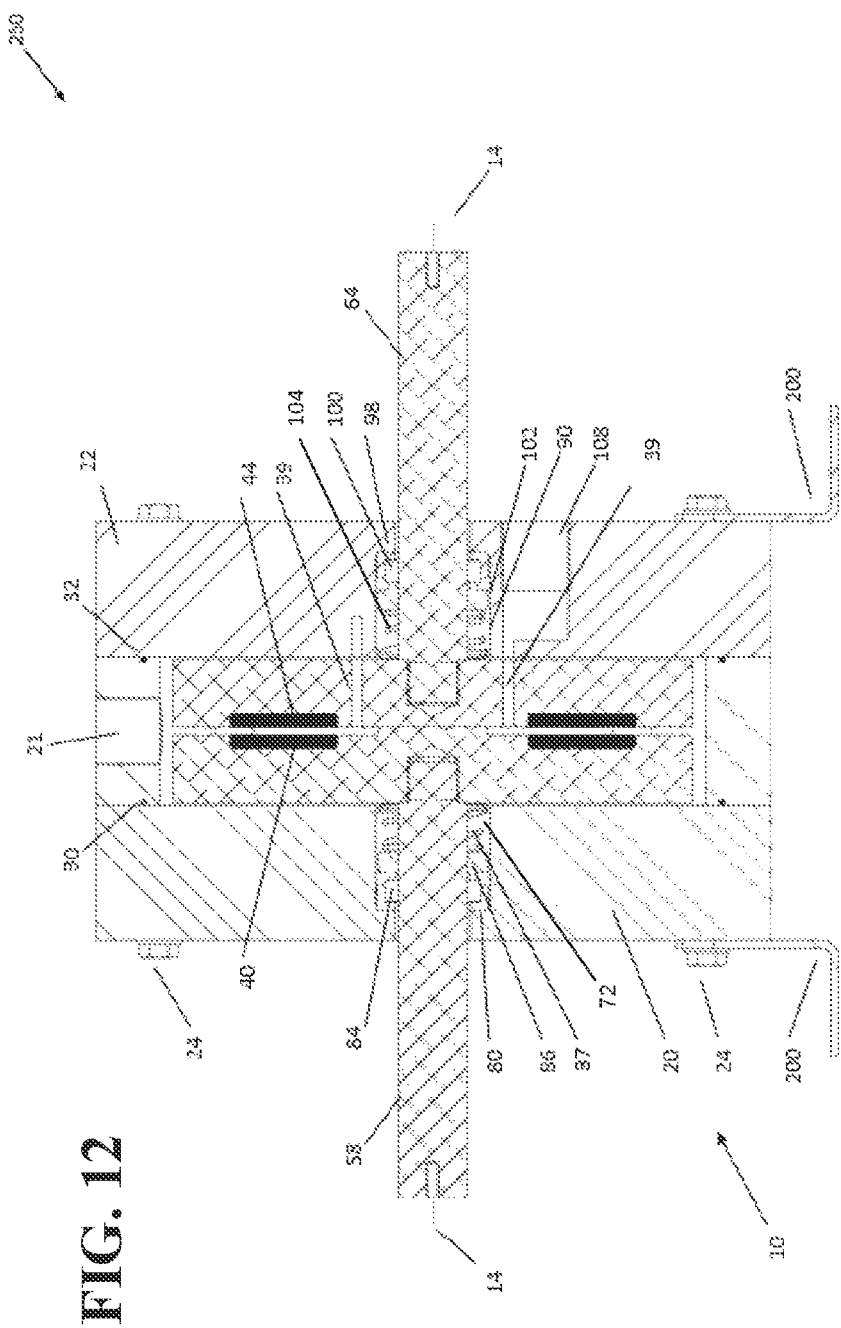
FIG. 12 is a cross-sectional side view of the reactor of FIG. 9.

Referring to FIGS. 9-12, a reactor 250 is shown, according to a third embodiment of this disclosure. FIG. 9 is a perspective view of the reactor 250 according to the third embodiment of this disclosure. FIG. 10 is a right perspective assembly view of the reactor 250 of FIG. 9. FIG. 11 is a left perspective assembly view of the reactor 250 of FIG. 9. FIG. 12 is a cross-sectional side view of the reactor 250 of FIG. 9.

As compared to the reactor 10 of FIGS. 1-4, the reactor 250 does not include the left shaft adaptor 60 and the right shaft adaptor 66. In this embodiment, the right electrode support plate 38 can include openings 39 (preferably six) close to the longitudinal axis 14.

Referring to the reactor 250, the rotor assembly 34 can be supported by the shafts 58, 64, which are rotatably supported by the left and right end plates 20, 22 instead of the left and right shaft adaptors 60, 66. As shown in FIG. 12, the left end plate 20 can include the first bore 72 centered about the longitudinal axis 14 and sized and shaped to receive the left shaft 58. As shown in FIG. 12, the left end plate 20 can include the second bore 80 concentric to the first bore 72. The second bore 80 can be slightly smaller in diameter than the first bore 72. The second bore 80 can be sized to receive (e.g., to snugly receive) the bearing 84. The mechanical shaft-seal assembly 86 can be positioned within the first bore 72, immediately adjacent to the bearing 84, and can be designed to press tightly against the bearing 84 by the spring 87. The bearing 84 can be sized to snugly receive the shaft 58 and provide rotational support to the shaft 58 during operation of the reactor 10.

As shown in FIG. 12, the right end plate 22 can include the first bore 90 centered about the longitudinal axis 14 and sized and shaped to receive the right shaft 64. As shown in FIG. 12, The right end plate 22 can include the second bore 98 concentric to the first bore 90. The second bore 98 can have a slightly smaller diameter than the first bore 90. The second bore 98 can be sized to receive (e.g., to snugly receive) the bearing 100. The mechanical shaft-seal assembly 102 can be positioned within the first bore 90 immediately adjacent to the bearing 100, and can be designed to press against the bearing 100 by the spring 104. The bearing 100 can be sized to snugly receive the right shaft 64 and provide rotational support to the shaft 64 during operation of the reactor 10.

The mechanical shaft-seal assembly 102 can be a well-known type of shaft seal that provides a reliable liquid-tight seal about the shaft 64 so that pressurized liquid, being treated within the bore 19 of the body 12, does not escape between the right shaft 64 and the right end plate 22 when the shaft 64 rotates or is stationary. The right end plate 22 can be almost the same as the left end plate 20, except that the right end plate 22 can include the inlet port 108. As shown in FIG. 12, the inlet port 108 can extend partially through the wall of the right end plate 22 and can provide liquid communication between the first bore 90 and a point outside the reactor 250.

Apart from the placement of the inlet port 108 and the absence of the left shaft adaptor 60 and the right shaft adaptor 66, the structure, assembly, and operation of reactor 250 can be the same as the reactor 10 described above and shown in FIGS. 1-4. As such, the structure, assembly, and operation of the reactor 250 of FIGS. 9-12 is not specifically described here in any great detail. Rotatably supporting the shafts 58 and 64 with the left and right end plates 20, 22 can reduce manufacturing costs.

Figure 13:
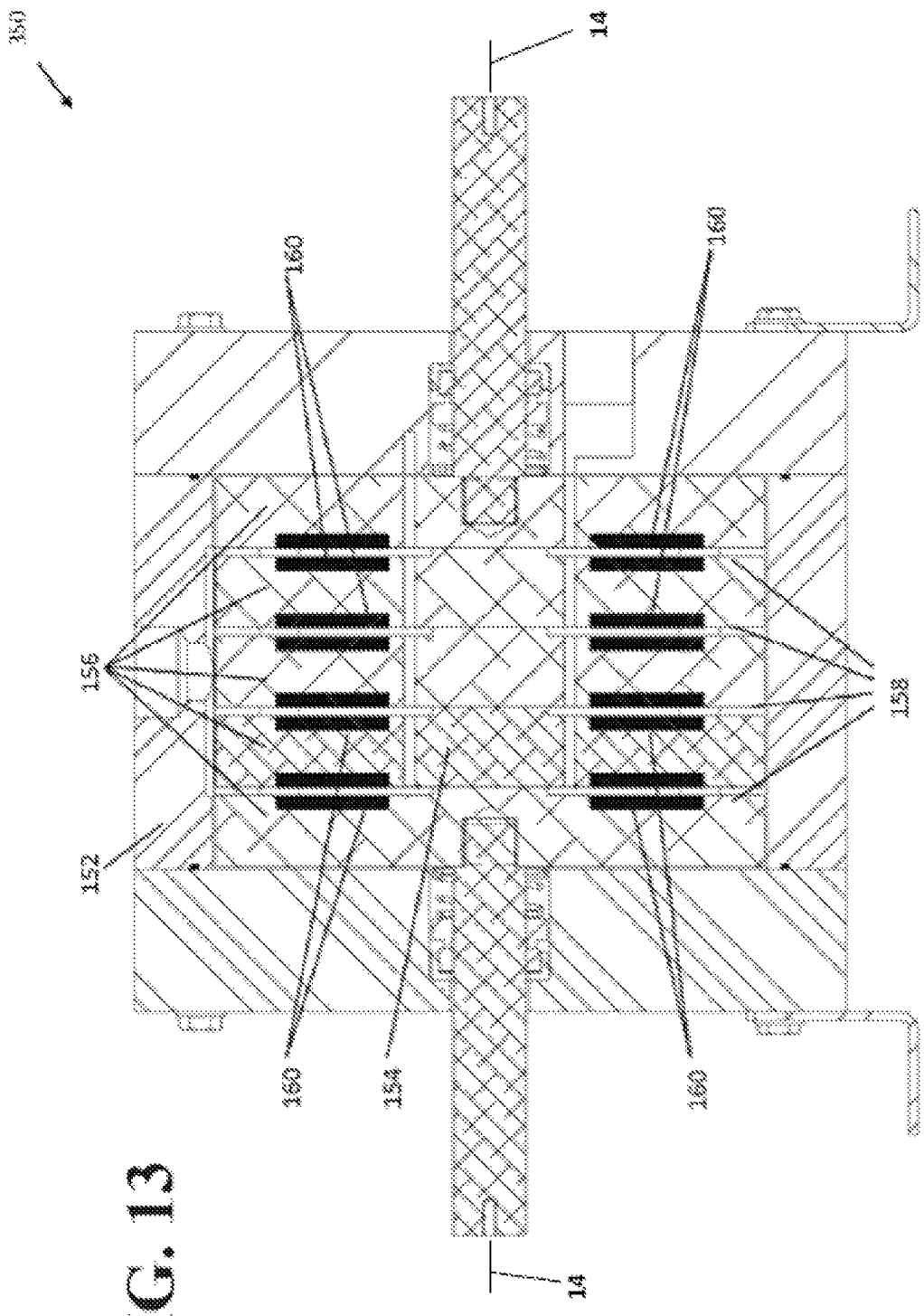
FIG. 13 is a cross-sectional side view of a reactor according to a fourth embodiment of this disclosure.

FIG. 13 is a cross-sectional side view of a reactor 350 according to a fourth embodiment of this disclosure. The reactor 350 includes the body 152 that is longer than the body 12 of reactor 250 of FIGS. 9-11 and according to the third embodiment of this disclosure, described above. The body 152 is sized to accommodate a rotor assembly 154 that includes multiple electrode plates 156. Each electrode plate 156 is secured to at least one other electrode plate 156 in the same manner as the left electrode support plate 36 is secured to the right electrode support plate 38 as described with respect to FIG. 4. The multiple electrode plates 156 are secured to each other to form a stack. In the example of FIG. 13, five electrode plates 156 are secured to each other, forming four gaps 158 through which liquid can pass against the electrodes 160 mounted in adjacent surfaces of each electrode plate 156, as in the above described embodiments. In other examples, more or less than five electrode plates 156 can be used.

Apart from the accommodation of multiple electrode plates 156, the structure, assembly, and operation of reactor 350 can be the same as the reactor 250 described above and shown in FIGS. 9-11. As such, the structure, assembly, and operation of the reactor 350 of FIG. 13 is not specifically described here in any great detail. Providing a reactor with additional electrode plates 156 (and, therefore, additional gaps 158) and additional electrodes 160 increases the electrode surface to maximize the electrochemical oxidation reaction and thereby allows the treatment of a greater volume of contaminated liquid over a given time period.

In Operation:

Rotation:

In operation of the reactor 10, and referring to FIGS. 1-6, the reactor 10 can be securely mounted using brackets 200 to a secure frame or support (not shown). The motor 70 can be mechanically secured to the right shaft 64 using an appropriate coupling (not shown). The coupling can be any coupling known by those skilled in the art. The motor 70 can be electrically powered and selected to selectively rotate the rotor assembly 34 within the bore 19 of the reactor 10 within the required parameters. The motor 70 operates when liquid to be treated is passing through the reactor 10. If the motor 70 is not operating, any liquid passing through the reactor 10 may still react with the electrodes 40, 44, but just not very efficiently since the laminar sub layer can trap stagnant liquid, as described above with respect to static reactors.

The shaft speed of the motor 70 can vary depending on the dimensions and weight of the rotor assembly. Smaller diameters and lighter rotors can be expected to rotate faster than heavier rotors having larger diameters. By way of example, a rotor assembly 34 having an approximate diameter of 150 mm can be expected to operate between 5000 and 7500 RPM. As another example, a rotor assembly 34 having an approximate diameter of 450 mm can be expected to operate around 2500 RPM. The axial speed of the electrodes 40, 44 with respect to the adjacent liquid is expected to be between 40 and 50 meters per second. As stated above, the electrodes rotate about longitudinal axis 14 and this rotation allows for a high axial speed relative to the passing liquid. This higher axial speed causes the laminar sub layer of the liquid against the electrodes to narrow, sometimes considerably, which in turn can allow a higher mass transfer. While, theoretically, there may be no upper limit to the axial speed, the higher speeds can require greater energy (in powering the motor 70) and the increased G-forces can increase the engineering demands of the components.

Referring again to FIGS. 1-6, the left side electrodes 40 and the respective left electrode support plate 36 are electrically conductive to the left shaft 58. Similarly, the right side electrodes 44 and the respective right electrode support plate 38 can be electrically conductive to the right shaft 64. A voltage differential can be applied to the shafts 58, 64. As such, any applied voltage differential across the left shaft 58 and the right shaft 64 can create a dielectric voltage differential across the gap 54. The body 12, the left and right end plates 20, 22 and the left and right shaft adaptors 60, 66 can be treated so that each includes a dielectric insulation layer. This can prevent any short circuit of voltage applied to the shafts 58, 64, as understood by those skilled in the art. Other types of insulation techniques (conventional or otherwise) may be used to electrically insulate the shaft 58, the left electrode support plate 36, and the left side electrodes 40 from the body 12, the left end plate 20 and the left shaft adaptor 60, and to electrically insulate the shaft 64, the right electrode support plate 38, and the right side electrodes 44 from the body 12, the right end plate 22 and the right shaft adaptor 66.

Applied Voltage:

A voltage differential can be applied to the shafts 58, 64 during operation using any appropriate rotational conductor (e.g., a high-voltage mercury liquid rotational contact). The rotational conductor can be a commercially available rotational conductor. For example, commercially available rotational conductors can be obtained from Meridian Laboratory, Inc. located in Middleton, Wis. 53562, or Mercotac, Inc. located in Carlsbad, Calif. 92011. A rotary electrical connector can use mercury (or another electrical conducting liquid) to provide continuous electrical contact between a stationery component and a rotating component. The connectors can provide a low (and sometimes, an extremely low) resistance electrical connection because the electrical conduction path is a liquid metal that is molecularly bonded to the contacts. In some embodiments, brush-type slip rings of the type which include a rotating metal ring upon which a graphite or metal brush rubs and transfers an electrical current can be used to transfer power to the shafts 58, 64. However, these mechanical contact type connectors may have several deficiencies.

While brush slip rings are technically simple in operation, the physical rubbing interface can be fraught with problems including wear, high electrical resistance, oxidation, and resistance fluctuations, which causes electrical noise. The electrical noise can adversely interfere with the electrical charges on the electrodes 40, 44 and make it difficult to accurately and efficiently control the electrolytic process required with the reactor 10.

The voltage applied to the shafts 58, 64 can create a voltage differential across the gap 54 and can induce the electrolytic process causing the electrodes 40, 44 to create oxidants, such as $H_2O_2$ and $O_3$ as well as Hydroxyl Radicals, as is understood by those skilled in the art and described in U.S. Pat. Nos. 9,028,689 and 9,061,323, the content of which are herein incorporated by reference in their entireties.

The amounts of voltage and current applied to the shafts 58, 64 can vary depending on the liquid to be treated, the solids level of the liquid, and the conductivity of the liquid. The amounts of voltage and current applied to the shafts 58, 64 can be in the range of about 100-30,000 A/m2 at a voltage of 1.5-24 V per reactor gap/channel.

According to another aspect of this disclosure, the applied voltage can be controlled in its electrical properties (e.g., voltage, amperage, etc.) while the polarity of the electrical current may be reversed in a frequency ranging from 1 HZ (1 time per second) to 5 GHz ($5.0*10^9$ per second). The polarity reversal can allow for the production of hydroxyl radicals at the electrode plates and can result in an increased oxidation efficiency of the reactor.

Flow of Liquid:

Referring now to FIG. 6, an operational liquid-flow schematic includes the reactor 10, a source of contaminated liquid 202, a supply pump 204, the motor 70, a voltage supply 206, and a discharge control valve 208. To mitigate the changes of liquid flow blockage within the reactor 10, solid particulates larger than a predetermined size, such as 50 microns, can be removed from the contaminated liquid 202 using filtering and separation techniques. Any filtering technique can be used. For example, conventional filtering and separation techniques (not shown), as understood by those skilled in the art can be used. Contaminated liquid can be directed via the conduit 203 into the inlet of the supply pump 204. The outlet of the supply pump 204 can be connected to the inlet port 108 of the reactor 10 via the conduit 210. The contaminated liquid can enter the inlet port 108 under pressure (by the supply pump 204), and can flow through the first bore 90, then through the openings 39 of the right electrode support plate 38 and into the gap 54, between the left and right electrode support plates 36, 38. The liquid can then flow through the gap 54 to the outlet port 21 of the body 12, as shown in FIGS. 1, 2, 3, and 6. Contaminated liquid can pass very close to the electrodes 40, 44 while it is located within the gap 54. As the electrodes 40, 44 rotate about the longitudinal axis 14 with a very fast axial speed relative to the adjacent liquid within the gap 54, the laminar sub layer can be very small allowing radicals generated by the electrically powered electrodes to effectively reach the liquid as it passes. As a result, the organic contaminates in the passing liquid can be effectively oxidized and eliminated and the contaminated liquid can become clean (within predetermined and acceptable levels) before leaving the reactor 10 through the outlet port 21.

Now clean, the liquid leaving the reactor 10 through the outlet port 21 can be directed through the conduit 212, then through the discharge control valve 208, and then through the conduit 214 to a clean liquid storage (not shown). In some embodiments, a return conduit (not shown) can connect the conduit 214, through a valve (not shown) to the conduit 203 so that clean water can be recycled through the reactor 10. For example, the clean water can be recycled through the reactor 10 when it be determined that the clean water discharging the outlet port 21 contains an unacceptable amount of contaminates.

The pressure of the liquid entering the reactor 10 can be controlled by the supply pump 204 and the flow of the liquid through the reactor itself can be controlled by the discharge control valve 208. According to aspects of this disclosure, the combination of the control of the feed into the reactor 10, the pressure of the liquid within the reactor 10, and the discharge from the reactor 10, the residence time of the liquid in the reactor (i.e., how long the liquid resides within the reactor 10) can be controlled. Controlling the resident time can allow the electrochemical oxidation process to have its highest efficiency in the rotational environment.

In addition to the control over the flow through the reactor vessel, controlling the rotation of the rotor assembly 34 within the bore 19 can control the axial velocity of the electrodes 40, 44 relative to the liquid located within the gap 54. The axial velocity of the electrodes 40, 44 can have a direct impact on the thickness of the laminar (viscous) sub layer. The effective axial velocity can accelerate from the feed flow rate velocity of the liquid entering the gap 54 (controlled by the supply pump 204) to a maximum axial speed velocity when the liquid reaches the periphery of the electrode support plates 36, 38. The axial speed of each point along the electrode support plates 36, 38 can increase as the location moves from the center (i.e., the longitudinal axis 14) to the periphery of each plate. With practically infinite control over electrical conditions, including applied voltage, current, frequency and type (direct or alternating voltage), as well as the speed of the electrode support plates 36, 38 and the electrodes 40, 44, an accurate control of the boundary layer thickness on the electrodes 40, 44 can be achieved. Such parameter control can allow the electrochemical oxidation process of the liquid within the gap 54 (in the rotational environment of the reactor) to perform most efficiently.

The rotational movement of the rotor assembly 34 effects the velocity of the electrodes 40, 44 and the laminar (viscous) sub layer. As such, the reactor 10 does not function as a pump and the rotation of the rotor assembly 34 within the bore 19 does not affect the flow or pressure of the liquid entering and leaving the reactor 10.

The rotational axis of the rotor assembly 34 (the longitudinal axis 14) may be oriented in any direction in 3-dimensional space. In an embodiment, the rotational axis can remain horizontal so that the gap 54 is vertically disposed. In an embodiment, the contaminated liquid enters the gap 54 as close to the longitudinal axis as possible and the outlet port 21 is positioned at the top of the body 12, as shown in FIGS. 2, 3, and 4. This arrangement can allow for easy venting of the reactor 10 and discharging the liquid and the gasses from the top of the reactor vessel while mitigating pockets of gas forming within the bore 19. Any gasses produced during the electrochemical oxidation process can be vented directly from the reactor body or can pass through the outlet port 21 with the discharged purified liquid.

Figure 7:
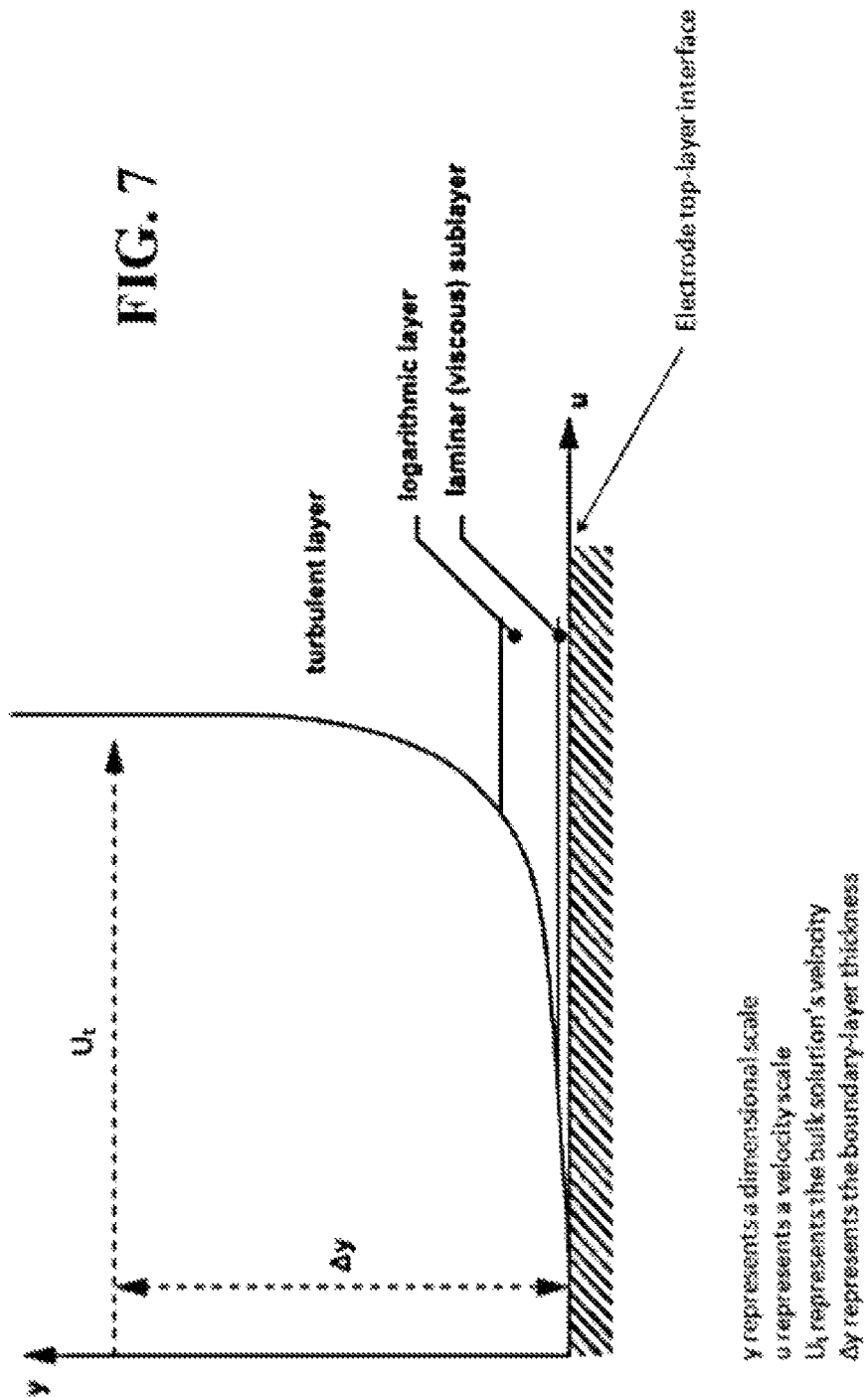
FIG. 7 depicts boundary layer formation of a static electrochemical reactors.
Figure 8:
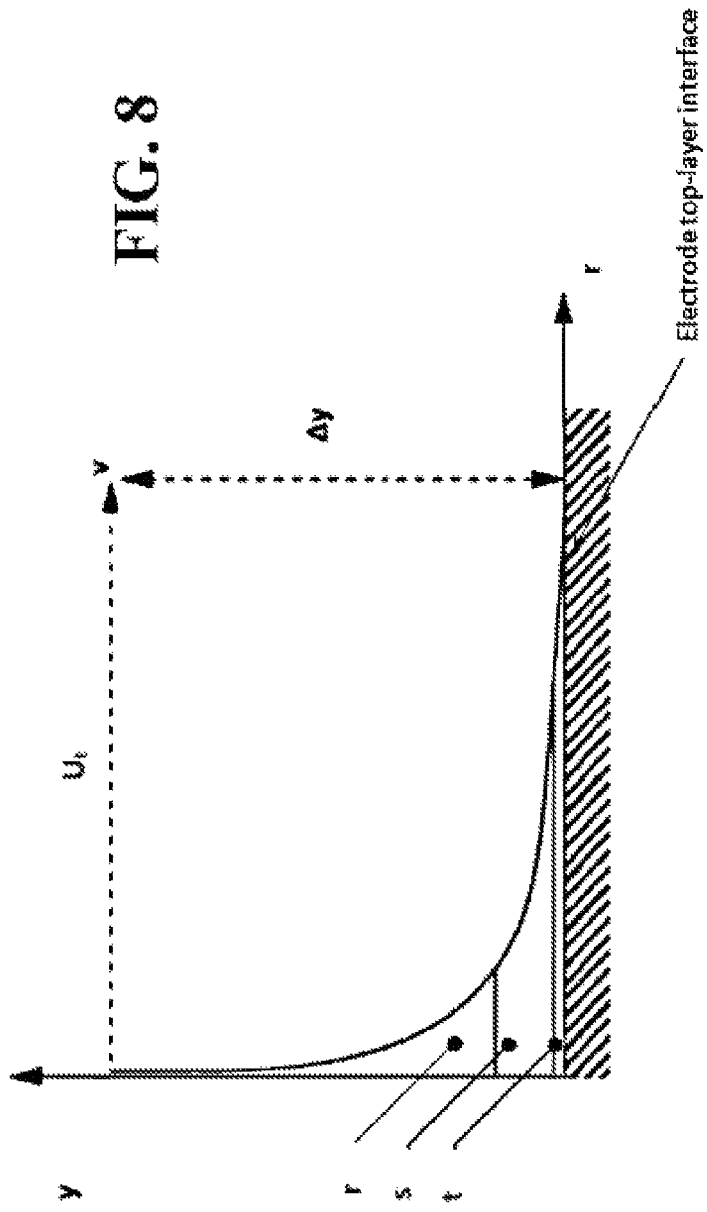
FIG. 8 depicts boundary layer formation of a rotational reactor according to embodiments of this disclosure.

FIG. 7 depicts boundary layer formation of a static electrochemical reactors. FIG. 7 illustrates that the liquid flowing within a static reactor may not effectively contact the surfaces of the electrodes. Contrastingly, FIG. 8 depicts boundary layer formation of a rotational reactor according to embodiments of this disclosure. FIG. 8 is an illustration of an exemplary velocity gradient above a dynamic electrode top layer interface showing how the boundary-layer thickness becomes thinner with increasing electrode surface velocity.

Figure 14:
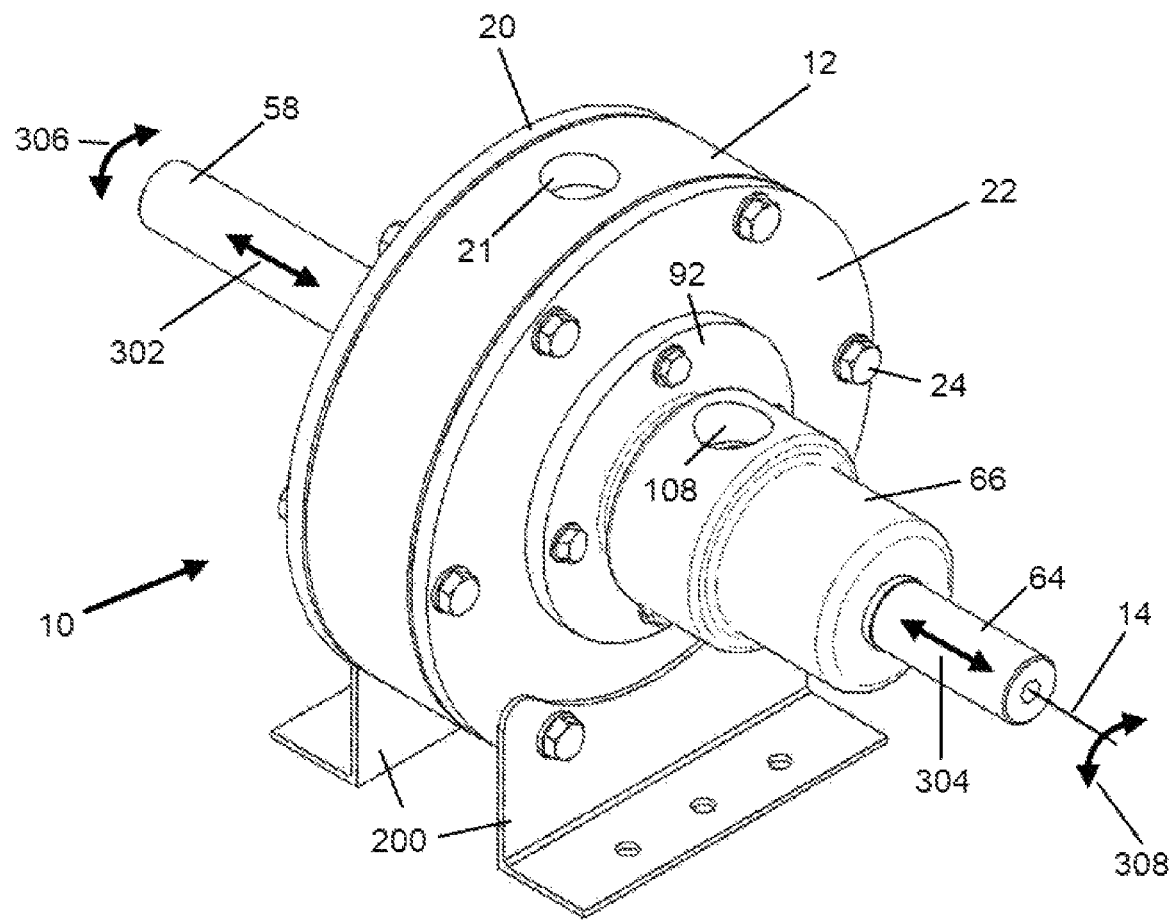
FIG. 14 is an upper right perspective view of the electrochemical oxidation reactor, according to embodiments of this disclosure, showing a reactor vessel, having an inlet and an outlet, and a shaft which supports a rotor assembly located within the vessel.

Referring now to FIG. 14, a reactor 10 is shown. This reactor includes the same overall structure and components as the reactor 10 of FIGS. 1-13 that are described in detail above. As mentioned above, among other parts, reactor 10 includes shaft 58 connected to a left electrode support plate 36, and a right shaft 64 connected to a right electrode support plate 38. The plates each include facing surfaces 42, 46 and are spaced apart to define the gap 54, therebetween. Electrodes 40, 44 are secured within recesses of respective plates 36, 38 so that a front surface of each electrode becomes co-planar to the respective surfaces of 42, 46 of respective support plates 36, 38. Each shaft 58, 64 is accessible outside body 12 and mechanically connected to a motor 70 which rotates the shafts, and their respective attached electrode support plates 36, 38 and the electrodes as well. As mentioned above, water from inlet 108 is directed through the gap 54 and exits through outlet 21. As water passes through the gap and creates a boundary layer adjacent to each adjacent surface. The layer closest to each surface of each plate 36, 38 is called a "laminar (viscous) sub layer" and can move very slowly. The rotation of the two plates forces the relative speed of the water and the plates to increase. This increase in relative speed will decrease the thickness of the sub-layer and increase the interaction between the liquid located within the gap and the laminar sub layer located immediately adjacent to the surface of the electrodes. This arrangement allows for the full use of hydroxyl radicals generated by the electrodes and results in an overall increase of the electrolytic reaction and a drastic increase of the mass-transfer of the reactor.

According to another embodiment, the relative rotational speed and rotational direction of each shaft 58, 64 is independently controlled, by a motor controller system (not show) which is well known to those skilled in the art. The motor controller system can control each motor independently following a predetermined program, or manually. This arrangement allows both shafts 58, 64 to rotate together, in the same direction, at the same or different speeds, or in different directions, at the same or different speeds. This is conveyed by Arrows 306, 308 in FIG. 14. The magnitude of the speeds and relative speeds of shafts 58, 64 will vary depending on the size and shape of the different components, the width of the gap 54, the size, shape and type of electrodes 40, 44 and the type and concentration of the contaminant in the liquid passing through the reactor 10. The rotational speed and direction of each shaft 58, 64 can be adjusted in real time to determine the best values, with a feedback controller connected to a contaminant sensor positioned downstream of outlet 21. Changing the rotational speed and direction of the shafts independently will introduce a controlled and consistent turbulence within the liquid located within the gap 54. This turbulence can introduce diffusion between the liquid located in the sub-layer located immediately adjacent to the surface of the plates (and electrodes) and the liquid located above or outside the sub-layer. The more diffusion occurring, the higher the probability of contaminants interacting with the hydroxyl radicals generated by the electrodes.

According to another embodiment, and referring to FIG. 14, each shaft 58, 64 is mounted to body 10 in such a manner to allow a controlled magnitude of axial displacement, as conveyed by arrows 302, 304. The axial displacement 302, 304 of shafts 58, 64 is preferably oscillatory, at any frequency, including ultrasonic (between 26 kHz and 38 kHz). Of course, since shafts 58, 64 are connected to electrodes 40, 44, respectively, the electrodes also move axially when the shafts move axially. If the shafts axially oscillate back and forth in synch with each other, then the gap 54 will not change in width, but will move back and forth a minute distance at the applied frequency. If the two shafts axially oscillate out of synch, then the gap 54 will repeatedly narrow and widen a minute distance at the applied frequency. The purpose of applying a controlled axial displacement to each shaft is to introduce turbulence to the liquid located within the gap 54. This turbulence can introduce diffusion between the liquid located in the sub-layer located immediately adjacent to the surface of the plates (and electrodes) and the liquid located above or outside the sub-layer. The greater the diffusion, the higher the probability that contaminants in the liquid will interact with hydroxyl radicals generated by the electrodes.

According to another aspect of this embodiment, the frequency value of axial displacement applied to each shaft 58, 64 may be equal, or different. Furthermore, the magnitude of axial displacement applied to each shaft can vary over time, can remain consistent, and can be equal or different to each shaft. Also, axial displacement can be applied to only one of the two shafts 58, 64.

According to another embodiment, each shaft 58, 64 can be independently rotated at any relative speed or direction, as introduced above, either alone, or in combination with the above-described axial displacement, in any combination of variables, including the modification of any variable over time.

According to another embodiment, the surfaces 42, 46 of electrodes 40, 44 are made with a topographical pattern that is meant to introduce turbulence to the liquid located within the gap 54. An example of such a pattern is including an array of dimples (e.g., like the dimples of a standard golf ball) across the exposed surfaces of each electrode, and/or across the surfaces of plates 36, 38. The size, shape, depth, and pattern of the dimples, in this example, can vary. The patterns can be depressions, such as the dimples, or projections from the surfaces, extending into the gap 54. Regardless, the patterns are meant to introduce turbulence to the liquid located within the gap 54 and therefore increase the magnitude of the diffusion of liquid between the sub-layer of the boundary layer and liquid located outside the sub-layer.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law. In addition, it is to be understood that the phraseology and terminology employed herein, as well as the abstract, are for the purpose of description and should not be regarded as limiting.

What is claimed is:

1. An oxidation reactor for treating a liquid, comprising:
    a hollow body having a cylindrical cavity with an inlet and an outlet, the liquid being selectively movable between the inlet and the outlet, through the cylindrical cavity, and the cylindrical cavity defining a longitudinal axis;
    a first shaft rotatably mounted to the hollow body along the longitudinal axis so that a first internal end of the first shaft is located within the cylindrical cavity, and a first external end of the first shaft is located outside the hollow body;
    a first electrode attached to the first shaft at the first internal end, the first electrode having a first planar surface;
    a second shaft rotatably mounted to the hollow body along the longitudinal axis so that a second internal end of the second shaft is located within the cylindrical cavity, and a second external end of the second shaft is located outside the hollow body;
    a second electrode attached to the second shaft at the second internal end, the second electrode having a second surface, the second surface of the second electrode faces the first planar surface of the first electrode and defines a gap therebetween, the first and second electrodes being immersed in the liquid located within the cylindrical cavity and being capable of forming oxidants to treat the liquid located within the gap; and
    the first and the second shafts being independently rotatable about the longitudinal axis.

2. The oxidation reactor of claim 1, wherein the first shaft rotates at a first speed and a first rotational direction and the second shaft rotates at a second speed and a second rotational direction.

3. The oxidation reactor of claim 2, wherein the first speed and the second speed are generally equal and the first and second rotational directions are the same.

4. The oxidation reactor of claim 3, wherein the first shaft is axially displaced along the longitudinal axis following an oscillatory movement at a first frequency and wherein the second shaft is axially displaced along the longitudinal axis following an oscillatory movement at a second frequency.

5. The oxidation reactor of claim 4, wherein the first frequency is generally equal to the second frequency.

6. The oxidation reactor of claim 4, wherein the first frequency and the second frequency are different.

7. The oxidation reactor of claim 2, wherein the first speed and the second speed are different.

8. The oxidation reactor of claim 7, wherein the first shaft is axially displaced along the longitudinal axis following an oscillatory movement at a first frequency and wherein the second shaft is axially displaced along the longitudinal axis following an oscillatory movement at a second frequency.

9. The oxidation reactor of claim 8, wherein the first frequency is generally equal to the second frequency.

10. The oxidation reactor of claim 8, wherein the first frequency and the second frequency are different.

11. The oxidation reactor of claim 2, wherein the first rotational direction and the second rotational direction are opposite.

12. The oxidation reactor of claim 2, wherein the first shaft is axially displaced along the longitudinal axis following an oscillatory movement at a first frequency and wherein the second shaft is axially displaced along the longitudinal axis following an oscillatory movement at a second frequency.

13. The oxidation reactor of claim 12, wherein the first frequency is generally equal to the second frequency.

14. The oxidation reactor of claim 12, wherein the first frequency and the second frequency are different.

15. The oxidation reactor of claim 1, wherein the first shaft is axially displaced along the longitudinal axis following an oscillatory movement at a first frequency.

16. The oxidation reactor of claim 1, wherein the second shaft is axially displaced along the longitudinal axis following an oscillatory movement at a second frequency.

17. The oxidation reactor of claim 1, wherein the first shaft is axially displaced along the longitudinal axis following an oscillatory movement at a first frequency and wherein the second shaft is axially displaced along the longitudinal axis following an oscillatory movement at a second frequency.

18. The oxidation reactor of claim 17, wherein the first frequency is generally equal to the second frequency.

19. The oxidation reactor of claim 17, wherein the first frequency and the second frequency are different.

20. An oxidation reactor, comprising:
    a hollow body, comprising:
        a cylindrical cavity configured to hold a liquid;
        an inlet configured to facilitate movement of the liquid into the cylindrical cavity;
        an outlet configured to facilitate movement of the liquid out of the cylindrical cavity;
    first and second shafts that each partially extend within the cylindrical cavity along a longitudinal axis, wherein the first and second shafts are each independently rotatable about the longitudinal axis; and first and second electrodes that are free of contact and respectively attached to the first and second shafts at a location within the cylindrical cavity, the first and second electrodes configured to contact the liquid within the cylindrical cavity.

\* \* \* \* \*